United States Patent [19]

Donlan

[11] Patent Number: 5,361,578
[45] Date of Patent: Nov. 8, 1994

[54] GAS TURBINE DUAL FUEL NOZZLE ASSEMBLY WITH STEAM INJECTION CAPABILITY

[75] Inventor: John P. Donlan, Oviedo, Fla.

[73] Assignee: Westinghouse Electric Corporation, Pittsburgh, Pa.

[21] Appl. No.: 161,217

[22] Filed: Dec. 2, 1993

Related U.S. Application Data

[63] Continuation of Ser. No. 933,137, Aug. 21, 1992, abandoned.

[51] Int. Cl.⁵ .............................. F23R 3/36
[52] U.S. Cl. .................. 60/39.32; 60/39.55; 60/742
[58] Field of Search ............... 60/39.32, 39.53, 39.55, 60/740, 742; 239/404, 425.5

[56] References Cited

U.S. PATENT DOCUMENTS

| | | | |
|---|---|---|---|
| 3,488,949 | 1/1970 | Jackson | 60/39.32 |
| 3,684,186 | 8/1972 | Helmrich | 60/742 |
| 3,777,983 | 12/1973 | Hibbins | 60/742 |
| 4,337,618 | 7/1982 | Hughes et al. | 60/39.55 |
| 4,342,198 | 8/1982 | Willis | 60/742 |
| 4,409,791 | 10/1983 | Jourdain et al. | 60/39.32 |
| 4,425,755 | 1/1984 | Hughes | 60/742 |
| 4,600,151 | 7/1986 | Bradley | 239/404 |
| 4,948,055 | 8/1990 | Belcher et al. | 239/425.5 |
| 5,228,283 | 7/1993 | Sciocchetti | 60/742 |
| 5,259,184 | 11/1993 | Borkowicz et al. | 60/39.55 |

*Primary Examiner*—Richard A. Bertsch
*Assistant Examiner*—Timothy S. Thorpe
*Attorney, Agent, or Firm*—G. R. Jarosik

[57] ABSTRACT

A fuel nozzle assembly is provided having the capability of burning either gaseous or liquid fuel, or both simultaneously, along with steam injection. The nozzle has a nozzle body that is attached to a nozzle cap by inner, outer and middle sleeves. The sleeves form inner and outer concentric annular conduits between themselves for directing the flow of gaseous fuel and steam from the fuel and steam inlet ports to the outlet ports. In addition, the inner sleeve forms a central chamber in which an oil fuel nozzle is disposed. Radial passages in the nozzle body allow cooling air to flow over the oil nozzle and through the oil outlet port, thereby preventing coking at the nozzle tip. The fuel nozzle assembly is originally built, and the nozzle cap is replaced, by sliding the sleeves forward and aft on the assembly so as to gain access to the next innermost sleeve.

12 Claims, 6 Drawing Sheets

GAS TURBINE DUAL FUEL NOZZLE ASSEMBLY WITH STEAM INJECTION CAPABILITY

This application is a continuation of application Ser. No. 07/933,137 filed Aug. 21, 1992, now abandoned.

BACKGROUND OF THE INVENTION

The present invention relates to fuel nozzles for gas turbines. More specifically, the present invention relates to a fuel nozzle assembly, along with a method of making and repairing same, suitable for use with liquid or gaseous fuels and having the capability for steam injection for NOx control.

Gas turbines include one or more combustors adapted to produce a hot gas by burning a fuel in compressed air. A fuel nozzle assembly is employed to introduce the fuel into the combustor. To provide maximum flexibility to the user, such fuel nozzles are often of the dual fuel type—that is, they have the capability of burning either a liquid or a gaseous fuel, or both simultaneously.

Unfortunately, combustion in gas turbine combustors results in the formation of oxides of nitrogen (NOx) in the combusted gas that is considered an environmental pollutant. One method of minimizing the formation of NOx involves injecting steam, via the fuel nozzle, into the combustor along with the fuel. However, such steam injection can not be readily accomplished in a traditional dual fuel nozzle so that the flexibility of a dual fuel nozzle is lost. Another problem with steam injection via conventional fuel nozzles is that it is difficult to introduce the steam symmetrically around the longitudinal center line of the combustor so as to prevent non-uniformities in the combustion gas.

A further drawback of traditional fuel nozzles is that they are subject to deterioration of the nozzle cap due burning and erosion from exposure to the hot combustion gases. If oil fuel is being burned, such nozzles are also subject to coking at the fuel outlet port. Consequently, replacement of the nozzle is a frequent occurrence. This presents a maintenance problem for the user.

It is therefore desirable to provide a fuel nozzle for a gas turbine capable of burning gaseous or liquid fuel, or both simultaneously, along with injecting steam. It would also be desirable to provide a method of replacing the nozzle cap portion of such a fuel nozzle.

SUMMARY OF THE INVENTION

Accordingly, it is the general object of the current invention to provide a fuel nozzle assembly for a gas turbine capable of burning gaseous or liquid fuel, or both simultaneously, along with injecting steam, and to provide a method of making and repairing such a fuel nozzle.

Briefly, this object, as well as other objects of the current invention, is accomplished in a gas turbine having (i) a compressor for producing compressed air, (ii) a combustor for heating the compressed air by burning fuel therein, thereby producing a heated Compressed gas; (iii) a fuel nozzle assembly for introducing fuel into the combustor, and (iv) a turbine for expanding the heated compressed gas produced by the combustor. The fuel nozzle assembly has (i) first and second fluid inlet ports, (ii) first, second and third fluid outlet ports, (iii) a first annular conduit placing the first fluid inlet port in flow communication with the first fluid outlet port, (iv) a second annular conduit placing the second fluid inlet port in flow communication with the second fluid outlet port, the second conduit enclosed by the first conduit, and (v) a centrally disposed chamber enclosed by the first and second annular conduits, the third fluid outlet port disposed in the chamber.

According to one embodiment of the current invention, the first fluid inlet and outlet ports are gaseous fuel inlet and outlet port, the second fluid inlet and outlet ports are steam inlet and outlet ports and the fuel nozzle assembly further comprises a liquid fuel nozzle disposed in the chamber, the liquid fuel nozzle being in flow communication with the third fluid outlet port.

The invention also concerns a method of making a fuel nozzle for a gas turbine, comprising the steps of (i) forming a nozzle body having first and second fluid inlet ports, (ii) forming a nozzle cap having first, second and third fluid outlet ports, (iii) affixing a first end of an inner sleeve to the nozzle cap, (iv) placing middle and outer sleeves around the inner sleeve so that the middle and outer sleeve are free to slide axially thereon, (v) affixing a second end of the inner sleeve to the nozzle body, thereby forming a centrally disposed chamber in which the third fluid outlet port is disposed, (vi) affixing a first end of the middle sleeve to the nozzle cap and a second end of the middle sleeve to the nozzle body, thereby forming a first annular chamber enclosing the central chamber and placing the first and second fluid inlet and outlet ports in flow communication, and (vii) affixing a first end of the outer sleeve to the nozzle cap and a second end of the outer sleeve to the nozzle body, thereby forming a second annular chamber enclosing the first annular chamber and placing the second fluid inlet and outlet ports in flow communication.

The invention further concerns a method of replacing a nozzle cap in a gas turbine fuel nozzle having a nozzle body connected to the nozzle cap by inner, outer and middle sleeves substantially concentrically arranged and attached to the nozzle body and cap, comprising the steps of (i) detaching the outer sleeve from the nozzle cap, (ii) separating the outer sleeve into first and second portions, (iii) sliding the outer sleeve portion axially, thereby exposing the middle sleeve, (iv) cutting through the inner and middle sleeves, thereby separating the nozzle cap from the nozzle body, (iv) affixing a replacement nozzle cap to the inner and middle sleeves, and (v) rejoining the first and second outer sleeve portions and reattaching the outer sleeve to the nozzle cap.

DESCRIPTION OF THE PREFERRED EMBODIMENT

Figure 1:
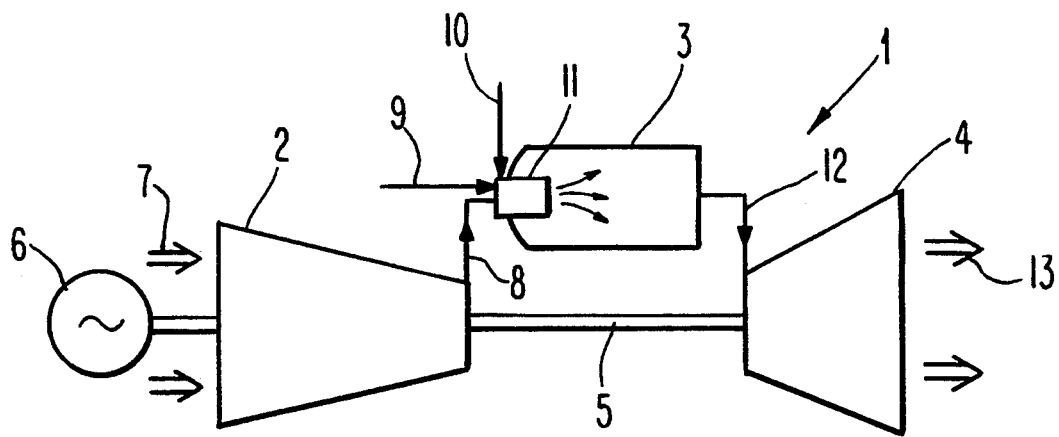
FIG. 1 is a schematic diagram of a gas turbine.

Referring to the drawings, there is shown in FIG. 1 a schematic diagram of a gas turbine 1. The gas turbine 1 is comprised of a compressor 2 that is driven by a turbine 4 via a shaft 5. Ambient air 7 is drawn into the compressor 2 and compressed. The compressed air 8 produced by the compressor 2 is directed to a combustor 3 in which a fuel 9 is burned. The fuel 9 may be a liquid, such as no. 2 distillate oil, or a gas, such as natural gas, and is introduced into the combustor 3 by a fuel nozzle assembly 11. The hot compressed gas 12 produced by the combustor 3 is directed to the turbine 4 where it is expanded, thereby producing shaft horsepower for driving the compressor 2, as well as a load, such as an electric generator 6. The expanded gas 3 produced by the turbine 4 is exhausted, either to the atmosphere directly or, in a combined cycle plant, to a heat recovery steam generator and then to atmosphere.

Figure 2:
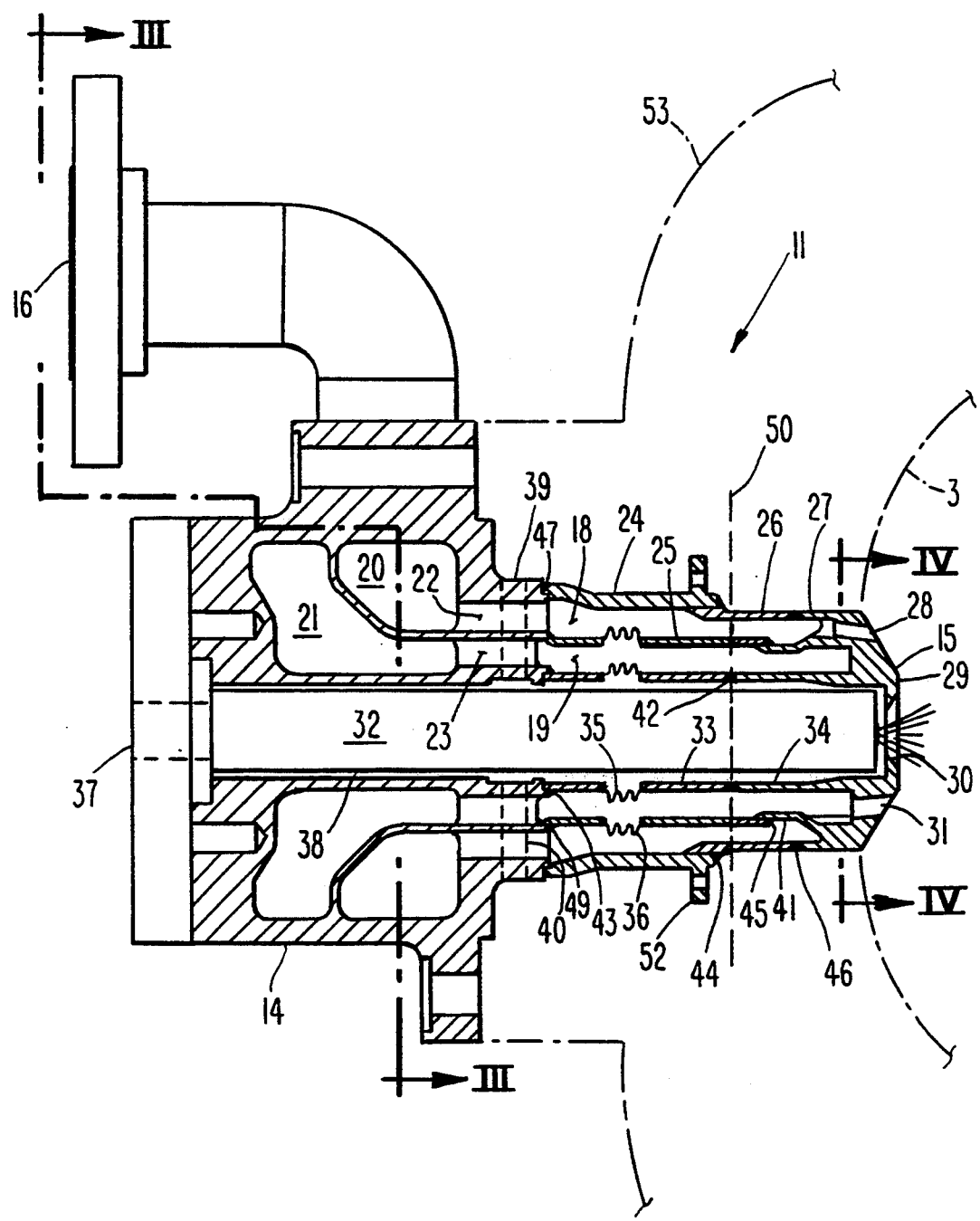
FIG. 2 is a longitudinal cross-section through the fuel nozzle shown in FIG. 1.
Figure 3:
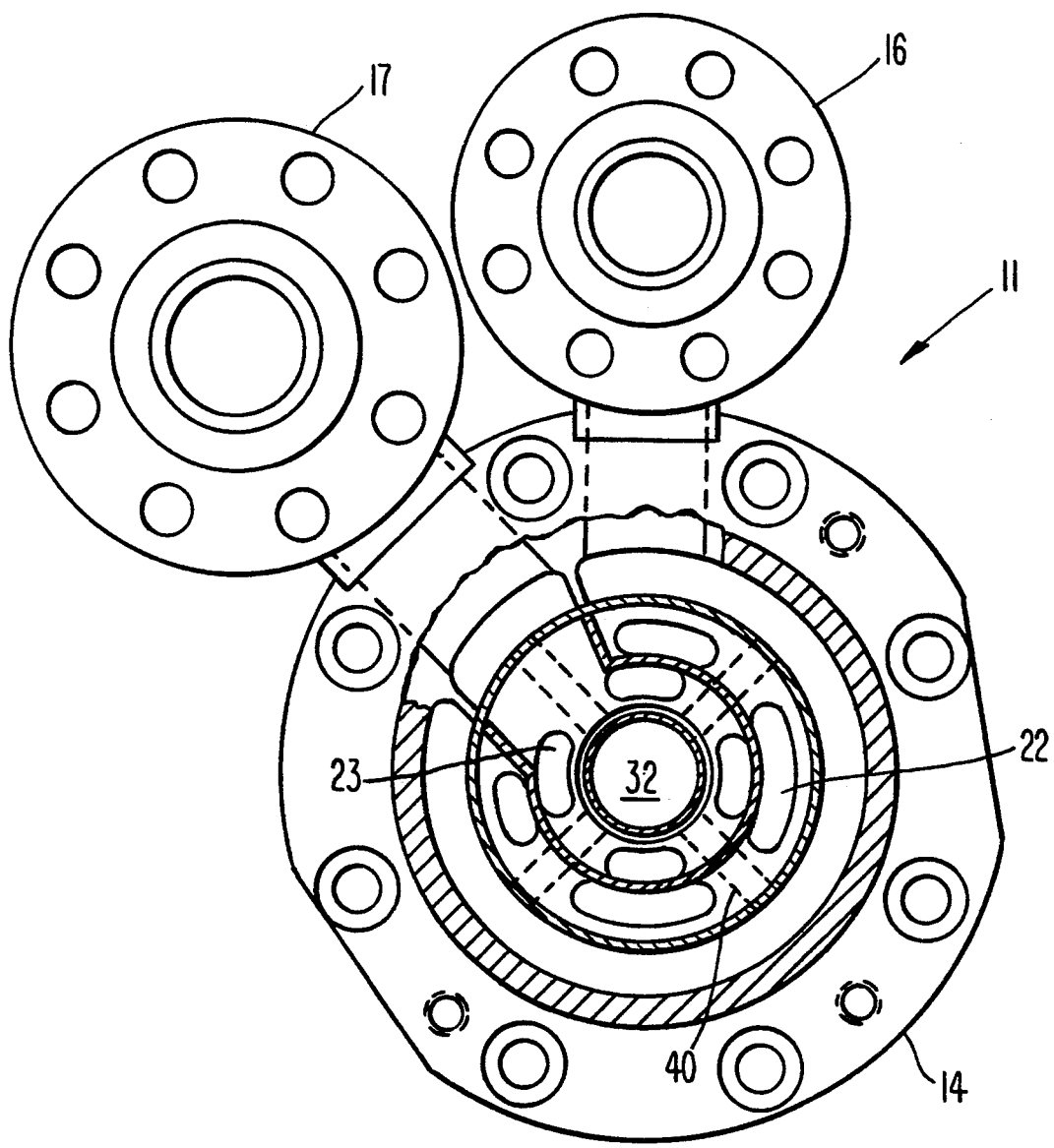
FIG. 3 is a cross-section taken through line III—III shown in FIG. 2.

As shown in FIG. 2, the fuel nozzle assembly 11 is mounted in a cylinder 53 (shown in phantom in FIG. 2), that encloses the combustors 3, and extends into the front end of the combustor. As shown in FIGS. 2 and 3, the fuel nozzle 11 of the current invention has a gas fuel inlet port 16. Gas fuel flows from the inlet port 16 to a manifold 20 formed in the nozzle body 14. The manifold 20 distributes the gas fuel to a series of passages 22 that then directs it to an annular conduit 18. From the annular conduit 18, the gas fuel discharges via outlet ports 28 formed in the face 29 of a nozzle cap 15, after which it is burned in the compressed air.

As previously discussed, a fluid 10, such as steam, is injected into the combustor 3 via the fuel nozzle assembly 11 in order to minimize the formation of NOx. Accordingly, the fuel nozzle assembly 11 also has a steam inlet port 17. Steam flows from the inlet port 17 to a manifold 21 formed in the nozzle body 14. The manifold 21 distributes the steam to a series of passages 23 that then direct it to an annular conduit 19. The steam annular conduit 19 is encircled by, and substantially concentric with, the gaseous fuel annular conduit 18. From the annular conduit 19, the steam discharges via outlet ports 31 formed in the face 29 of the nozzle cap 15, after which it enters the combustion gas to reduce NOx formation.

The fuel nozzle assembly 11 also has a centrally disposed oil fuel nozzle 38, which may be of the conventional type. Oil fuel enters an inlet port 37 at the base of the oil nozzle and exits through an outlet port 30 formed in the front face 29 of the nozzle cap 15, after which it is burned in the compressed air. Thus, according to the current invention, the fuel nozzle assembly 11 is capable of burning gaseous or liquid fuel, or both simultaneously, as well as injecting steam into the combustor 3. This greatly increases the flexibility of the fuel nozzle assembly according to the current invention.

As previously discussed, oil fuel nozzles are subject to coking at the outlet port 30. According to the current invention, coking is prevented by supplying cooling air, drawn from the compressor discharge air 8, to the outlet port 30. This is accomplished by radially extending cooling air passages 40 arranged around the nozzle body 14. The inlets 39 of these passages 40 are in flow communication with the compressed air flowing within the combustor cylinder 53. From the inlets 39, the passages 40 direct the cooling air to a central cavity 32 that is encircled by, and concentric with, the gas and steam annular conduits 18 and 19, respectively, and in which the oil nozzle 38 is disposed. The cooling air flows along the annular space between the inner sleeve 33 and the oil nozzle 38 and then exits the nozzle via the oil fuel outlet port 30. By washing over the tip of the oil nozzle 38 and flowing through the oil fuel outlet port 30, the cooling air prevents coking.

As shown in FIG. 2, the annular gas fuel conduit 18 is formed between an outer sleeve 24, 26 and a middle sleeve 25, with the middle and outer sleeves being concentrically arranged. The outer sleeve is comprised of front 26 and rear 24 portions joined by a weld 44. The rear end of the outer sleeve rear portion 24 is attached to the fuel nozzle body 14 by a weld 47. The front end of the outer sleeve front portion 26 is attached to an outer ring 27, projecting rearward from the nozzle cap 15, by a weld 46. A flange 52 is formed on the outer sleeve rear portion 24 for installing a swirl plate (not shown) onto the nozzle assembly to aid in mixing the fuel and compressed air.

The middle sleeve 25 is comprised of front and rear portions joined by an expansion bellows 36. The expansion bellows reduces the stress on the middle sleeve 25 due to differential thermal expansion in the fuel nozzle assembly 11. The rear end of the middle sleeve 25 is attached to the fuel nozzle body 14 by a weld 49. The front end of the middle sleeve 25 is attached to a middle ring 41, projecting rearward from the nozzle cap 15, by a weld 45.

As also shown in FIG. 2, the annular steam conduit 19 is formed between the middle sleeve 25 and the inner sleeve 33, also concentrically arranged. Like the middle sleeve 25, the inner sleeve 33 is comprised of front and rear portions joined by an expansion bellows 35. The rear end of the inner sleeve 25 is attached to the fuel nozzle body 14 by a weld 43. The front end of the inner sleeve 33 is attached to an inner ring 34, projecting rearward from the nozzle cap 15, by a weld 42. The inner sleeve 25 forms the central cavity 32 in which the oil nozzle 38 is disposed.

Figure 4:
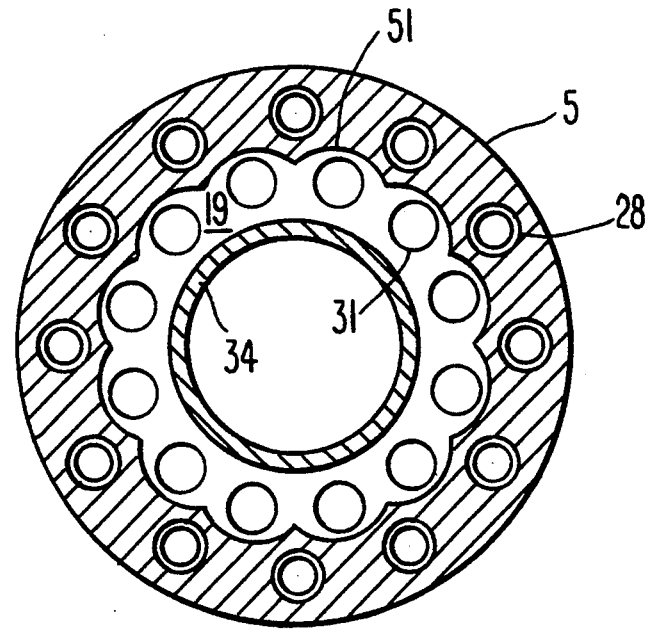
FIG. 4 is a cross-section taken through line IV—IV shown in FIG. 2.

As shown in FIG. 4, the gas fuel and steam outlet ports 28 and 31, respectively, are circumferentially arranged around concentric circles on the face of the nozzle cap 15. The ports are arranged in a staggered relationship, thereby minimizing the space required for the ports. In addition, the nozzle cap 15 has scallops 51 cut out around each steam outlet port 31, thereby allowing use of larger diameter gas fuel and steam outlet ports than would otherwise be possible.

According to the current invention, uniformity in the combustion gas with respect to the longitudinal center line of the combustor 3 is achieved by utilizing concentric annular conduits to supply steam and gas fuel to outlet ports that are arranged around concentric circles.

Figure 5:
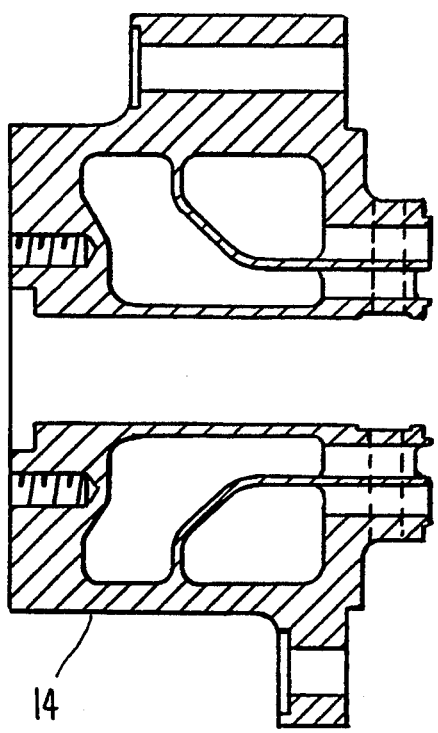
FIGS. 5–7 show the fuel nozzle of FIG. 2 in various stages of assembly.
Figure 6:
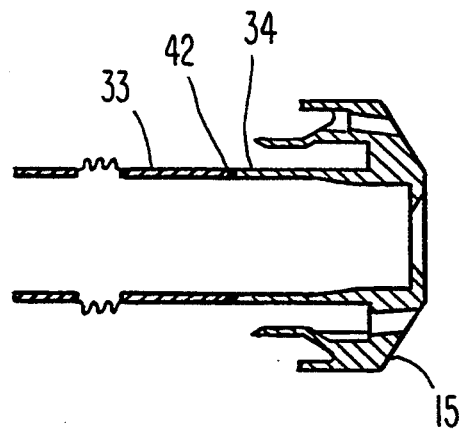
Figure 7:
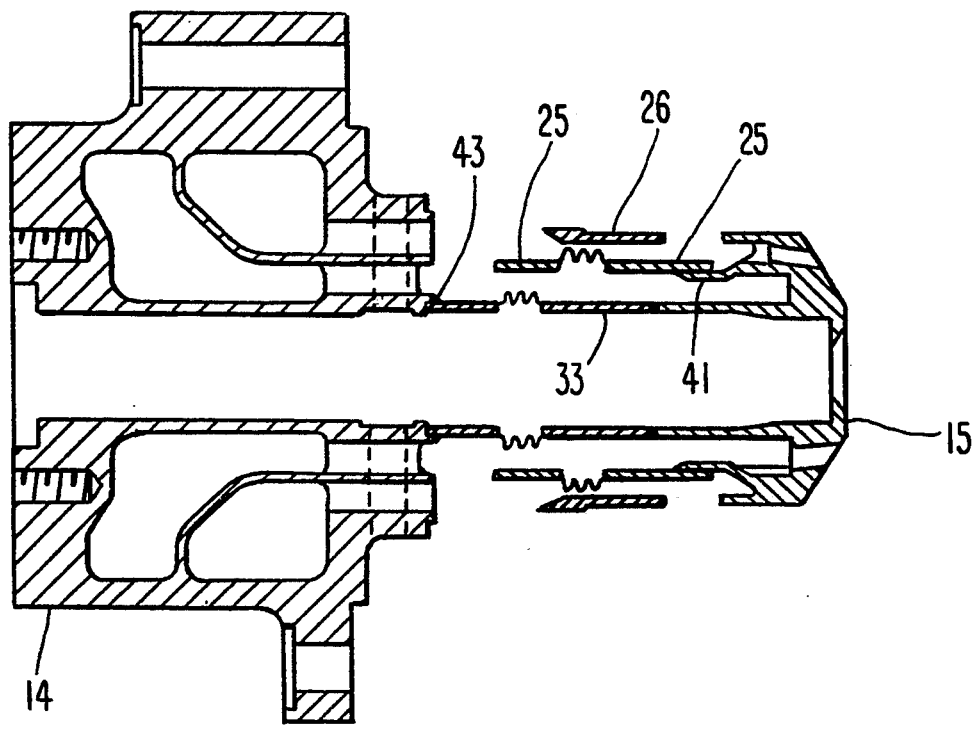

The novel arrangement of the fuel nozzle assembly according to the current invention, in which inner and outer annular chambers enclose a central cylindrical chamber, each concentric with the others, is made possible by a novel assembly method. First, the nozzle body 14, shown in FIG. 5, is cast, although other fabrication techniques could also be utilized. Next, the nozzle cap 15 is attached to the inner sleeve 33 via a weld 42, as shown in FIG. 6. The middle sleeve 25 and the front portion 26 of the outer sleeve are then slipped over the inner sleeve 33 so that they are free to slide along the assembly, as shown in FIG. 7. With the middle sleeve 25 slid forward, weld 43 is formed to attach the inner sleeve 33 and nozzle cap 15 to the nozzle body 14.

In the next step, the middle sleeve 25 is slid rearward into its final position, as shown in FIG. 2, and its front and rear ends are attached to the nozzle body 14 and nozzle cap middle ring 41 by welds 45 and 49, respectively. The forward portion 26 of the outer sleeve is then slid forward into its final position, as shown in FIG. 2, and attached to the nozzle cap outer ring 27 by weld 46. Lastly, the rear portion of the outer sleeve 24 is slid over the assembly and attached to the nozzle body 14 via weld 47 and to the front portion 26 of the outer sleeve 26 via weld 44.

Figure 8:
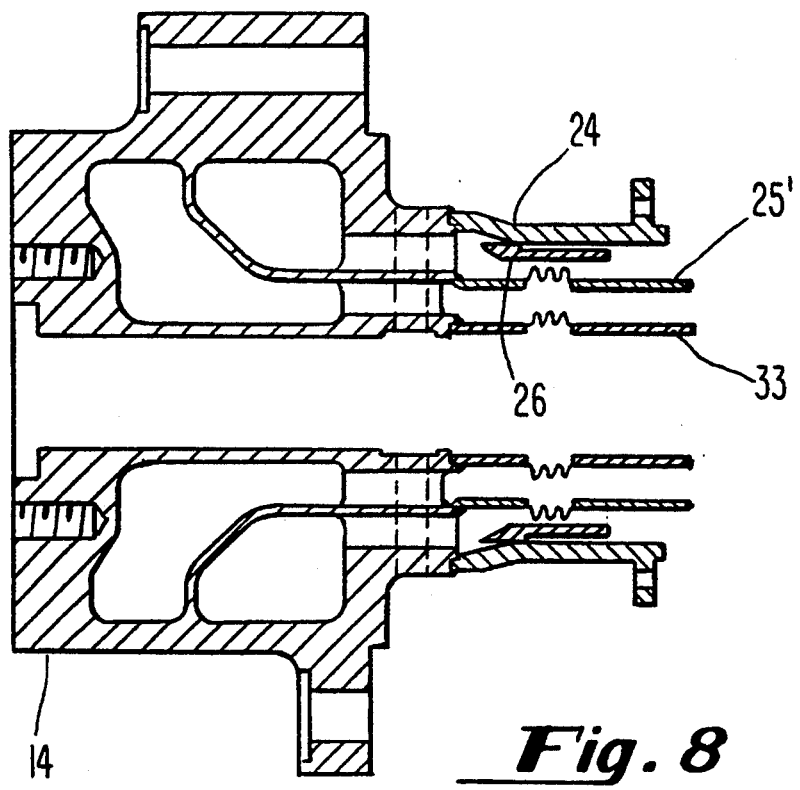
FIG. 8 shows the body of the fuel nozzle of FIG. 2 after the front section of the fuel nozzle has been cut away to allow replacement of the nozzle cap.

According to the current invention, a novel method is provided for replacing the nozzle cap 15, which, as previously discussed is a source of frequent maintenance. After removing the oil fuel nozzle 38, the weld 44 joining the forward and rear portions 26 and 24, respectively, of the outer sleeve is broken. Next, forward portion 26 of the outer sleeve is separated from the nozzle cap 15 by cutting through the weld 46 attaching the outer sleeve forward portion to the nozzle cap outer ring 27. The outer sleeve forward portion 26 can then be slid rearward, exposing the middle sleeve 25. The middle 25 and inner 33 sleeves are then cut along a line 50, shown in FIG. 2, that passes through the weld 42 attaching the inner sleeve to the nozzle cap inner ring 34. The result is a partial nozzle assembly, shown in FIG. 8, to which a new nozzle cap 15 can now be attached. Note that since the middle sleeve 25 was cut at a location rearward of the weld 45 joining it to the nozzle-cap middle ring 41, in order to provide access to the inner sleeve weld 42, only a portion 25' of the original middle sleeve 25 remains.

Figure 9:
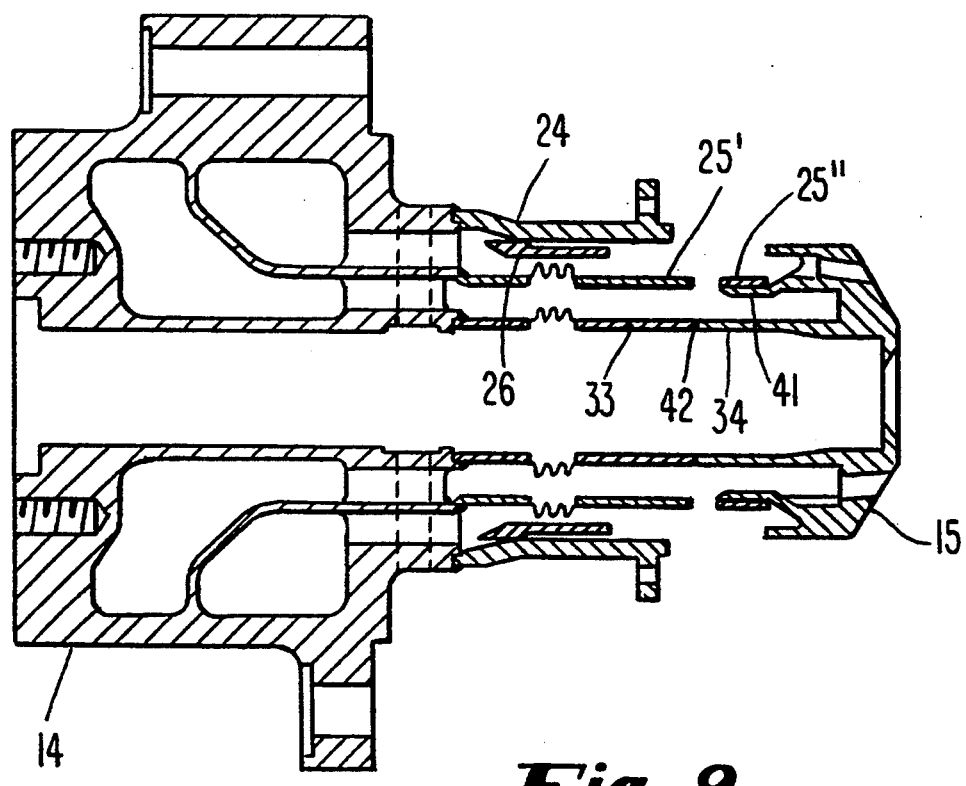
FIGS. 9 and 10 show various stages of the replacement of the fuel nozzle cap on the fuel nozzle body of FIG. 8.
Figure 10:
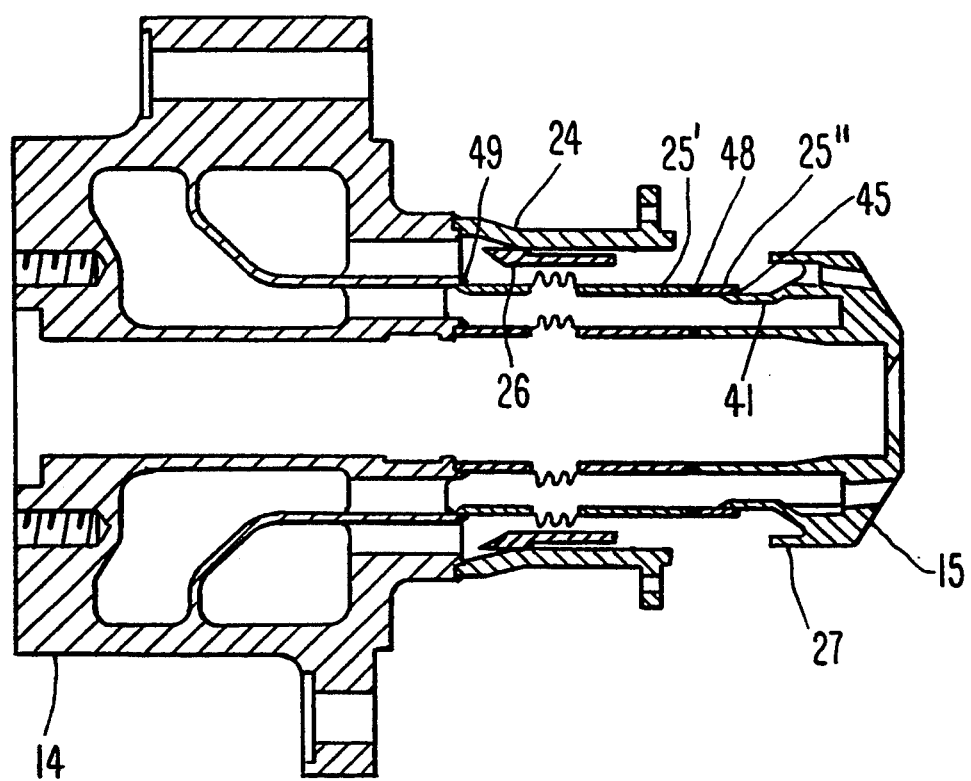

Prior to installing the new nozzle cap 15, a new middle sleeve portion 25", shown in FIG. 9, that is of sufficient length to restore the middle sleeve to its original length, is slid on to the nozzle cap middle ring 41. Next, as shown in FIG. 9, the inner sleeve 33 is attached to the nozzle cap inner ring 34 by weld 42. The new middle sleeve portion 25" is then slid rearward and attached to the remaining portion 25' of the original middle sleeve by a weld 48 and to the nozzle cap middle ring 41 by a weld 45, as shown in FIG. 10. Lastly, the outer sleeve forward portion 26 is slid into position and attached to the outer sleeve rear portion 24 and to the outer ring 27 of the new nozzle cap 15 by welds 44 and 46, respectively, shown in FIG. 2.

Although the current invention has been described with reference to a fuel nozzle assembly having the capability of burning oil or gas fuel and using steam injection, the invention is also applicable for introducing other fluids into the combustor—for example, the central chamber 32 could house a nozzle for naphtha or pulverized coal fuel or for a water spray to further reduce NOx. Accordingly, the present invention may be embodied in other specific forms without departing from the spirit or essential attributes thereof and, accordingly, reference should be made to the appended claims, rather than to the foregoing specification, as indicating the scope of the invention.

I claim:

1. A gas turbine, comprising:
   a compressor for producing compressed air;
   a combustor for heating said compressed air by burning a fuel therein whereby a heated compressed gas is produced;
   a turbine for expanding said heated compressed gas produced by said combustor; and
   a fuel injecting assembly for introducing said fuel into said combustor, wherein said fuel injecting assembly comprises:
   liquid fuel injecting means having a liquid fuel conduit for allowing liquid fuel to be supplied to said combustor;
   air injecting means having a substantially annular air conduit for cooperating with said liquid fuel injecting means;
   steam injecting means having a substantially annular steam conduit for allowing steam to be supplied to said combustor; and
   gaseous fuel injecting means having a substantially annular gaseous fuel conduit for allowing gaseous fuel to be supplied to said combustor;
   wherein said gaseous fuel conduit substantially encircles said steam conduit, said steam conduit substantially encircles said air conduit, and said air conduit substantially encircles said a liquid fuel conduit.

2. The gas turbine as recited in claim 1, wherein said fuel nozzle assembly comprises an inner sleeve, an outer sleeve, and a middle sleeve wherein said outer sleeve and said middle sleeve form at least a portion of said air conduit and said middle sleeve and said inner sleeve form at least a portion of said steam conduit.

3. The gas turbine as recited in claim 2, wherein said inner sleeve comprises an expansion means for accommodating axial expansion.

4. The gas turbine as recited in claim 2, wherein said middle sleeve comprises an expansion means for accommodating axial expansion.

5. The gas turbine as recited in claim 3, wherein said expansion means comprises a bellows.

6. The gas turbine as recited in claim 4, wherein said expansion means comprises a bellows.

7. A fuel injecting assembly for introducing fuel into a gas turbine combustor, said fuel injecting assembly comprising:
   liquid fuel injecting means having a liquid fuel conduit for allowing liquid fuel to be supplied to said combustor;
   air injecting means having a substantially annular air conduit for cooperating with said liquid fuel injecting means;
   steam injecting means having a substantially annular steam conduit for allowing steam to be supplied to said combustor; and
   gaseous fuel injecting means having a substantially annular gaseous fuel conduit for allowing gaseous fuel to be supplied to said combustor;
   wherein said gaseous fuel conduit is disposed substantially encircles said steam conduit, said steam conduit substantially encircles said air conduit, and said air conduit substantially encircles said liquid fuel conduit.

8. The fuel injecting assembly as recited in claim 7, wherein said fuel nozzle assembly comprises an inner sleeve, an outer sleeve, and a middle sleeve wherein said outer sleeve and said middle sleeve form at least a portion of said air conduit and said middle sleeve and said inner sleeve form at least a portion of said steam conduit.

9. The fuel injecting assembly as recited in claim 8, wherein said inner sleeve comprises an expansion means for accommodating axial expansion.

10. The fuel injecting assembly as recited in claim 8, wherein said middle sleeve comprises an expansion means for accommodating axial expansion.

11. The fuel injecting assembly as recited in claim 9, wherein said expansion means comprises a bellows.

12. The fuel injecting assembly as recited in claim 10, wherein said expansion means comprises a bellows.

* * * * *